United States Patent
Hecht et al.

[11] Patent Number: 5,134,885
[45] Date of Patent: Aug. 4, 1992

[54] CIRCUIT ARRANGEMENT FOR MEASURING A MECHANICAL DEFORMATION, IN PARTICULAR UNDER THE INFLUENCE OF A PRESSURE

[75] Inventors: Hans Hecht, Korntal; Winfried Kuhnt, Stuttgart, both of Fed. Rep. of Germany

[73] Assignee: Robert Bosch GmbH, Stuttgart, Fed. Rep. of Germany

[21] Appl. No.: 579,939

[22] Filed: Sep. 7, 1990

Related U.S. Application Data

[63] Continuation-in-part of Ser. No. 402,999, Sep. 5, 1989, abandoned, which is a continuation-in-part of Ser. No. 146,369, Dec. 15, 1987, abandoned.

[30] Foreign Application Priority Data

Apr. 16, 1986 [DE] Fed. Rep. of Germany ....... 3612810

[51] Int. Cl.$^5$ .............................................. G01L 19/04
[52] U.S. Cl. ........................................ 73/708; 330/256
[58] Field of Search ................... 73/708, 721, 727; 330/256, 289; 374/172, 197, 198; 338/4

[56] References Cited

U.S. PATENT DOCUMENTS

| | | | |
|---|---|---|---|
| 3,528,022 | 9/1970 | Adams | 330/256 |
| 4,667,516 | 5/1987 | Schulz | 73/708 |
| 4,813,272 | 3/1989 | Miyazaki et al. | 73/708 |
| 4,836,027 | 6/1989 | Hannappel et al. | 73/708 |

OTHER PUBLICATIONS

"Integrated Pressure Transducer", Measurement Techniques, vol. 20, No. 5, May 1977, Vaganov et al., pp. 706–707.

Primary Examiner—Jin F. Ng
Assistant Examiner—Brent A. Swarthout
Attorney, Agent, or Firm—Michael J. Striker

[57] ABSTRACT

A circuit arrangement for measuring a mechanical deformation includes a pressure sensor with compression-deformable resistors for generating an analog deformation-dependent signal and a circuit for evaluating the analog deformation-dependent signal. The evaluating circuit includes a summing amplifier and a temperature-dependent coupling resistor connected between the input of the summing amplifier and the pressure sensor. The coupling resistor has a temperature coefficient adjusted to compensate for the temperature characteristic of the measuring sensitivity of the analog deformation-dependent signal. A temperature sensor generates a temperature-dependent signal corresponding to a static temperature characteristic of the evaluating circuit. There is provided a circuit for applying the temperature-dependent signal to the input of the summing amplifier to combine it with the analog deformation-dependent signal. The summing amplifier generates at its output a temperature-compensated, deformation-dependent output signal.

2 Claims, 1 Drawing Sheet

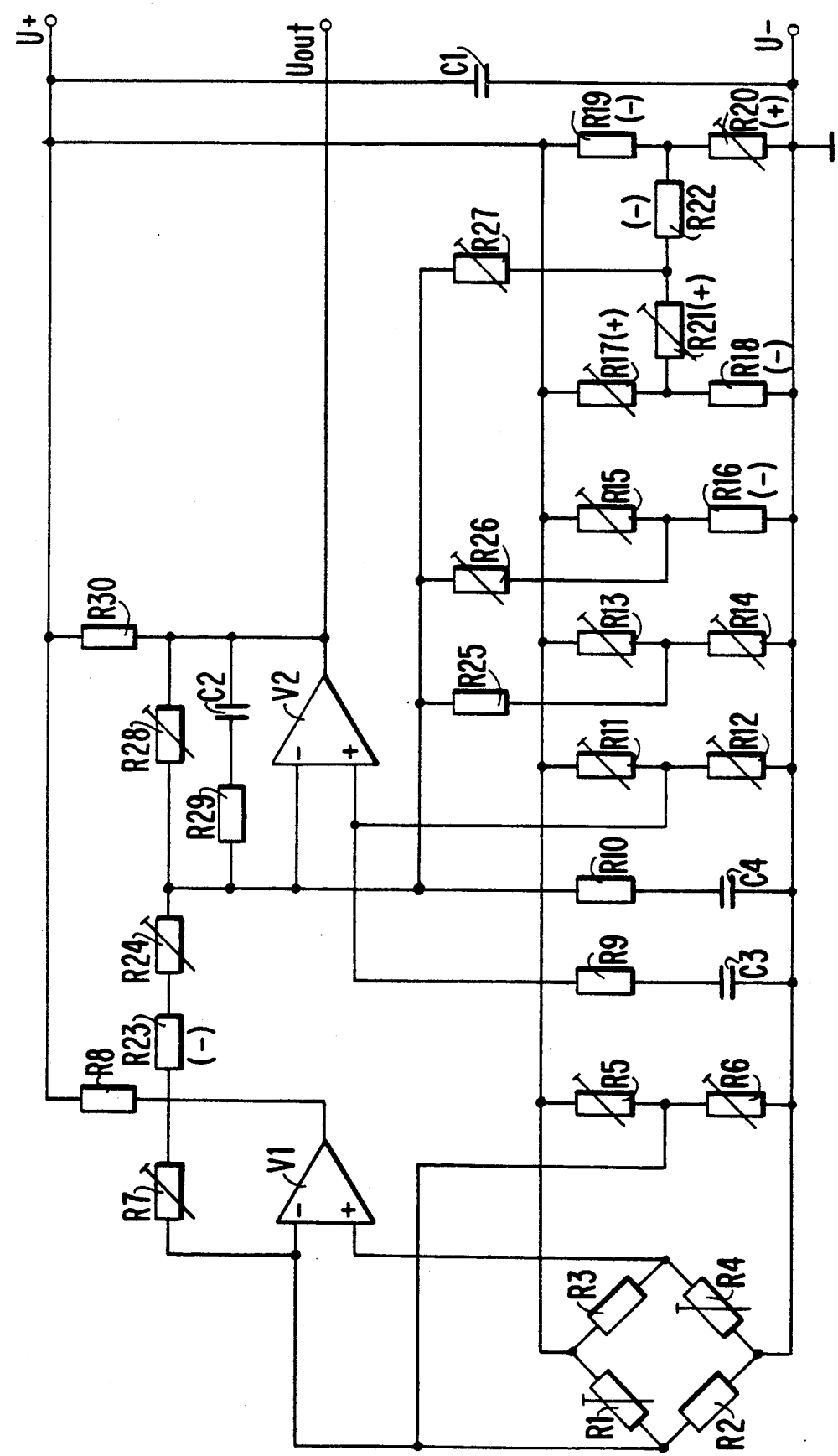

CIRCUIT ARRANGEMENT FOR MEASURING A MECHANICAL DEFORMATION, IN PARTICULAR UNDER THE INFLUENCE OF A PRESSURE

CROSS-REFERENCE TO RELATED APPLICATIONS

This application is a continuation-in-part of application Ser. No. 402,999, filed Sept. 5, 1989, now abandoned, which in turn is a continuation-in-part application of application Ser. No. 146,369, filed on Dec. 15, 1987, now abandoned, and entitled "Circuit Arrangement for Measuring a Mechanical Deformation, in Particular Under the Influence of a Pressure."

BACKGROUND OF THE INVENTION

The invention relates to a circuit arrangement for measuring a mechanical deformation and having a pressure sensor which, under the influence of a mechanical signal, emits an analog deformation-dependent signal.

German Utility Model 81 19 025 discloses a sensor for detecting the pressure of a medium and having at least one element the resistance of which varies under the influence of pressure. As this element, a conventional commercially available resistor component, preferably a carbon-film resistor, a thin-film resistor or a thick-film resistor is used. The elements are preferably disposed in a bridge circuit, and to compensate for temperature factors and to increase the pressure-dependent signal, resistor components having different temperature and pressure coefficients are used. It is also proposed that resistor elements be disposed on a substrate that is elastically deformable in response to pressure, so that the simultaneous action of pressure and expansion or compression of the resistor component cause a signal increase.

In designing circuit arrangements for evaluating sensor signals, it is often necessary to provide suitable measures for temperature compensation. Typically, the temperature characteristic of the output signal of the circuit arrangement is first calculated or plotted. The temperature characteristic can be represented mathematically as a function dependent on the temperature, which in turn can be developed into a power-series expansion. For most technical applications, it is sufficient for the linear member of the temperature characteristic to be compensated for, since the higher-order members are sufficiently small with respect to an allowable tolerance. For high-precision applications, however, provisions must be made to compensate for quadratic and sometimes even higher components of temperature characteristic. The actual compensation is then generally such that a separate temperature-dependent signal is formed within the circuit arrangement, and this signal is suitably added to or subtracted from the output signal.

SUMMARY OF THE INVENTION

It is accordingly the object of the present invention to provide a circuit arrangement for measuring a mechanical deformation, in particular under the influence of a pressure, which enables a high-precision temperature-compensated measurement.

This object is attained by the circuit arrangement of the aforedescribed type and comprising a summing amplifier, a temperature-dependent coupling resistor through which the deformation-dependent signal is applied to the summing amplifier to compensate for the temperature characteristic of the measuring sensitivity, a temperature sensor composed of a network of temperature-dependent resistors which are arranged for compensating the linear and square components of the temperature characteristic of the circuit arrangement.

The circuit arrangement according to the invention has the advantage over the circuit arrangements known from the prior art in that not only a compensation of the static temperature characteristic is effected, but the temperature characteristic of the measuring sensitivity is also compensated for at the same time. This compensation of the temperature characteristic of the measuring sensitivity will be attained by supplying the output signal of the pressure sensor via a temperature-dependent resistor to an amplifier and the following circuit. A further particularly great advantage of the circuit arrangement according to the invention consists in that the quadratic component of the temperature characteristic is compensated for by a portion of the circuit arrangement comprising solely resistor components. These components can accordingly be particularly simply produced by thick-film techniques using resistor pastes having various temperature coefficients, with optional subsequent trimming with a laser beam.

The present invention both as to its construction so to its method of operation, together with additional objects and advantages thereof, will be best understood from the following detailed description of specific embodiments when read in connection with the accompanying drawings.

BRIEF DESCRIPTION OF THE DRAWINGS

The single FIGURE of the drawing shows a circuit diagram of a circuit arrangement according to the invention.

DETAILED DESCRIPTION OF THE PREFERRED EMBODIMENT

The circuit arrangement shown in the drawing is operated between two supply voltage terminals $U_+$ and $U_-$. The terminal $U_-$ represents the ground of the circuit arrangement, while a stabilized feed voltage of 5 V is applied to the terminal $U_+$. A capacitor C1 connected between the supply voltage terminals serves to protect against voltage peaks that may arise, for instance originating in the ignition system.

Connected between the supply voltage terminals is a resistor bridge circuit R1, R2, R3, R4, the diagonal connections of which lead to the inputs of a measuring amplifier V1, which is an operational amplifier. Specifically, the junction point of the resistors R1, R2 leads to the inverting input, and the junction point of the resistors R3, R4 leads to the non-inverting input of the measuring amplifier V1. The output of the measuring amplifier V1 is fed back via an adjustable resistor R7 to the inverting input. Also connected between the supply voltage terminals is the series circuit of two resistors R5, R6, the junction point of which is likewise connected to the inverting input of the measuring amplifier V1. The resistors R5, R6 and R7 are adjustable resistors, for example thick-layer-resistors which can be adjusted by laser-adjustment.

The resistors R1, R2, R3, R4 together form an arrangement for measuring a mechanical deformation under the influence of a pressure, that means, that they form a pressure sensor such as that known from German Utility Model 81 19 025. The resistors are located on a thick-film membrane and are disposed in such a manner that, when the pressure is exerted upon the membrane, the resistors R1, R4 are deformed by compression, while the resistors R2, R3 are stretched in length. Because of a piezoresistive effect of the thick-film resistor paste from which the resistors R1, R2, R3, R4 are formed, their change in resistance is approximately 8 times as great as their geometric change in length.

Since the resistor bridge circuit is operated at a constant voltage, an imbalance of the bridge occurs when pressure is exerted upon the thick-film membrane, and this imbalance is expressed as the appearance of a diagonal voltage of the bridge, which is supplied to the measuring amplifier V1. The amplification factor of the arrangement is adjusted with the resistor R7, while a desired offset is adjusted with the resistance divider R5, R6. The output of the measuring amplifier V1 is connected with the resistor R8, which is also connected with the supply voltage terminal $U_+$ so that the current needed for the measuring amplifier V1 is furnished via the resistor R8. The measuring amplifier V1 and the resistors R5-R8 are the signal-amplifying stage in which the output-voltage of the resistor bridge is amplified.

In addition to the pressure measuring effect, however, the resistor bridge circuit exhibits a temperature effect, which is yielded in the diagonal voltage of the bridge and which is also amplified in the signal-amplifying stage V1, R5-R8, but which is not desirable for pressure measurement. This temperature effect is composed of a temperature characteristic of the pressure measurement sensitivity and a temperature response of the offset of the circuit arrangement. The temperature characteristic of the offset has a curved course, which is approximately composed of a linear and a quadratic component.

The output of the measuring amplifier V1 leads via a temperature-sensitive series circuit of two resistors R23(−), R24, where the coupling resistor R23(−) has a negative temperature coefficient, that means, that with increasing temperature, the resistance becomes smaller and the resistor R28 is an adjustable resistor, to the inverting input of a summing amplifier V2. Because the resistance R23(−) has a negative temperature coefficient, it is possible, to compensate the temperature characteristic of the sensitivity by the series-connection of R23(−) and R24. The amplification factor of the second amplifier V2 is defined via an adjustable resistor R28, which is connected between the output and the inverting input of the summing amplifier V2. The output of the summing amplifier V2 is connected to an output terminal $U_{out}$ of the circuit arrangement. The output current of the circuit arrangement is obtained via a resistor R30, which is connected between the supply voltage terminal $U_+$ and the output of the summing amplifier V2.

Also connected between the terminal $U_+$ and the terminal $U_-$ is the series circuit of the two adjustable resistors R11, R12, the junction point of which is connected to the non-inverting input of the summing amplifier V2. Via the divider ratio of the resistors R11, R12, a coarse adjustment of the input voltage offset of the summing amplifier V2 can be performed. a fine adjustment of the offset is possible with three resistors R13, R14, R25. To this end, the adjustable resistors R13, R14 are connected in series between the terminals $U_+$ and $U_-$, while their junction point is connected via the resistor R25 to the inverting input of the summing amplifier V2.

For smoothing the output signal and for frequency response compensation of the summing amplifier V2, the series circuit of a resistor R29 and a capacitor C2 is connected parallel to the adjustable feedback resistor R28. Furthermore, the non-inverting input is connected via a resistor R9 and a capacitor C3, and the inverting input is connected via a resistor R10 and a capacitor C4, to the ground of the circuit at the terminal $U_-$.

The remaining portion of the circuit arrangement shown in the drawing serves as temperature sensor and serves the purpose of temperature characteristic compensation of the offset of the arrangement R1-R4 and R7, R8, V1. This offset consists of one part, which is linearly dependent on the temperature and another part, which is quadratically dependent on the temperature. To compensate the linearly dependent part, the temperature-dependent series circuit of two resistors R15, R16 is connected between the terminals $U_+$ and $U_-$, and the junction point of these resistors is connected via an adjustable resistor R26 to the inverting input of the summing amplifier V2. To compensate the quadratically dependent part, a temperature-dependent resistor bridge circuit R17(+), R18(−), R19(−), R20(+) is connected between the terminals $U_+$ and $U_-$, and a series circuit of two temperature dependent resistors R21(+), R22(−) is additionally disposed in its bridge diagonal, between the junction points of the temperature-dependent resistors R17(+), R18(−) and the temperature-dependent resistors R19(−), R20(+). The junction point of the temperature-dependent resistors R21(+), R22(−) leads via an adjustable resistor R27 likewise to the inverting input of the summing amplifier V2. The resistors R17, R20 and R21 are temperature-dependent and adjustable.

The output signal of the measuring amplifier V1 can be represented approximately by the following equation:

$$U_{V1} = U_0 + a_0 \cdot p + a_1 \cdot p \cdot T + a_2 \cdot T + a_3 \cdot T^2$$

in which
 $U_{V1}$: output signal of the amplifier V1
 $U_0$: direct component of the output signal
 p: pressure upon the pressure sensor
 T: temperature of the circuit arrangement
 $a_0, a_1, a_2, a_3$: coefficients The equation shows terms, which are linearly dependent on the temperature, quadratically dependent on the temperature and linearly dependent on the pressure and the temperature.

What is desired now is an output signal at the terminal $U_{out}$ that, except for the direct current component, is dependent only on the pressure p, and as little as possible on the temperature T. This is attained by temperature compensation in which to the output signal $U_{V1}$ of the measuring amplifier V1, suitable temperature-dependent signals having the opposite algebraic sign (+ or −) are added. To this end, the temperature-dependent series connection R23, R24, the temperature-dependent series connection R15, R16, the temperature-dependent bridge circuit R17 to R22 and the summing amplifier V2 is provided.

The temperature-dependent signals are generated in the circuit arrangement by providing the resistors formed by thick-film techniques, using resistor pastes which have their own positive or negative temperature coefficients. Specifically, the resistors R15(+), R17(+), R21(+), R20(+) have a positive temperature coefficient, while the resistors R23(−), R16(−), R18(−), R19(−), R22(−) have a negative temperature coefficient. The symbols (+), (−) in the disclosure and the drawing symbolizes positive or negative temperature coefficients of the resistors. The linear temperature member of the output signal of the amplifier V1 is now compensated for with the aid of the resistors R15, R16, R26. The quadratic temperature member is compensated for by the resistors R17–R22 and R27. The component dependent on both pressure and temperature is compensated for with the resistors R23, R24.

By suitably dimensioning of the various resistors and their temperature coefficients and by balancing the adjustable summing resistors R24, R26, R27, a highly accurate pressure measurement, largely independent of temperature, can be attained with the pressure sensor R1, R2, R3, R4.

While the invention has been illustrated and described as embodied in a circuit arrangement for measuring a mechanical deformation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is desired to be protected by Letters Patent is set forth in the appended claims.

What is claimed is:

1. A circuit arrangement for measuring a mechanical deformation, comprising a pressure sensor with compression-deformable resistors for generating an analog deformation-dependent signal; and a circuit for evaluating the analog deformation-dependent signal, the evaluating circuit including a summing amplifier having an input and an output, a temperature-dependent coupling resistor connected between said input of said summing amplifier and said pressure sensor and having a temperature coefficient adjusted to compensate for the temperature characteristic of the measuring sensitivity of the analog deformation-dependent signal, a temperature sensor for generating a temperature-dependent signal corresponding to a static temperature characteristic of the evaluating circuit, and means for applying said temperature-dependent signal to said input of the summing amplifier to combine with the analog deformation-dependent signal, said temperature-dependent signal comprising a signal component linearly dependent on the temperature, said summing amplifier generating at said output thereof a temperature-compensated, deformation-dependent output signal, said pressure sensor including an operational amplifier having inputs connected across a diagonal of said bridge circuit to generate at an output of said operational amplifier said analog deformation-dependent signal, said output of said operational amplifier being connected via said temperature-dependent coupling resistor to said input of the summing amplifier, said temperature sensor including a temperature sensitive resistor bridge circuit and a series connection of two temperature sensitive resistors connected parallel to said temperature-sensitive resistor bridge circuit, and having opposite temperature coefficients to deliver said linearly dependent signal component at their common connection point.

2. A circuit arrangement as defined in claim 1, wherein the temperature-dependent signal comprises a signal component linearly dependent on the temperature, and a signal component quadratically dependent on the temperature.

* * * * *